United States Patent [19]

Karlotski

[11] 4,129,348

[45] Dec. 12, 1978

[54] METHOD OF MANUFACTURING TUNGSTEN HALOGEN LAMP

[75] Inventor: Robert J. Karlotski, Londonderry, N.H.

[73] Assignee: GTE Sylvania Incorporated, Danvers, Mass.

[21] Appl. No.: 852,464

[22] Filed: Nov. 17, 1977

[51] Int. Cl.² .............................................. H01J 9/395
[52] U.S. Cl. ........................................ 316/20; 316/24
[58] Field of Search ................................... 316/20, 24

[56] References Cited

U.S. PATENT DOCUMENTS

| | | | |
|---|---|---|---|
| 3,811,063 | 5/1974 | Rees et al. | 316/20 X |
| 3,854,786 | 12/1974 | Notelteirs et al. | 316/20 |
| 3,912,961 | 10/1975 | Rees et al. | 316/20 X |

*Primary Examiner*—Richard B. Lazarus
*Attorney, Agent, or Firm*—James Theodosopoulos

[57] ABSTRACT

The fill of a tungsten halogen lamp includes an organic halide. After the exhausting, filling and sealing steps, the lamp is heated in a monoxidizing atmosphere to the dissociation temperature of the organic halide prior to lamp finishing.

3 Claims, No Drawings

METHOD OF MANUFACTURING TUNGSTEN HALOGEN LAMP

THE INVENTION

This invention is concerned with tungsten halogen lamps in which the halogen is introduced into the lamp as an organic halide, such as is disclosed in U.S. Pat. Nos. 3,788,725, 3,811,063 and 3,912,961. It is particularly concerned with minimizing the problem resulting from dark carbon deposits on the wall of the lamp envelope, as mentioned in U.S. Pat. No. 3,854,786. Such problems are particularly severe in lamps used in reprographic applications, such as are disclosed in U.S. Pat. No. 3,943,395. In such lamps, the active filament sections comprise only part of the total filament length and since the carbon deposit occurs on the wall only in the vicinity of the hot filament, the reduction of light emission is worse in such lamps.

Methods of eliminating carbon deposits are known. For example, heating of the exhaust tubulation during the filling step will dissociate the organic halide and deposit the carbon on the exhaust tubulation. This requires modification of the exhaust tubulation to permit heating thereof to the dissociation temperature and, therefore, adds considerable cost to the lamp. This method also removes the carbon from the lamp which is undesirable, since the carbon acts as a getter for oxygen and water.

Another method, disclosed in U.S. Pat. No. 3,854,786, involves cooling the lamp to liquid nitrogen temperatures and then energizing the filament at slightly below and above rated voltage. This method is not readily conducive to automation and, also, undesirably deposits the carbon mainly on the tungsten filament, where it can cause tungsten embrittlement.

It is an object of this invention to provide a method for the use of hydrocarbon halides in the fill of tungsten halogen lamps which overcomes the disadvantages mentioned above.

According to the present invention, the manufacture of the lamp is in standard fashion through the exhaust, filing and sealing operation. But after tip-off of the exhaust tube, and before the lamp bases are attached, the lamp is heated in an inert atmosphere (to prevent lead-in wire oxidation) to the dissociation temperature of the organic halide for a sufficient time to accomplish dissociation. When the organic halide is dissociated in this manner, results are obtained which are not totally understood. The bulb wall remains devoid of carbon deposits both after the heating step and after lamp burning. Also, in the case of reprographic lamps which are burned with short duty cycles, characteristic halogen deposits which normally occur on the bulb over the inactive filament sections are greatly minimized. Gettering by the freed carbon of contaminants driven from the quartz and other lamp parts may occur during the high temperature heating step, forming CO and $CO_2$ which are relatively inert and invisible. Essentially, a clean lamp throughout life results because of the step of heating the organic halide to dissociation before lamp burning. Because of the gettering action of the carbon and the removal of $O_2$ from the halogen cycle, a higher average lamp life is obtainable.

In a specific example, a 1000W-115V-T2½ tungsten halogen lamp was exhausted, filled with a mixture of argon (partial pressure of 2.5 atmospheres) and chloroform (partial pressure of 4 torr), tipped off and then heated to the dissociation temperature of chloroform (about 800° C) for 5 minutes in a nitrogen-flushed lehr. The lamp was then finished by adding bases to the ends of the lamp.

When the lamp was burned at a duty cycle of 2 seconds on, 20 seconds off for several hundred thousand cycles, there were no black carbon deposits, and the halogen deposits over inactive filament sections were light. In contrast, lamps which were not heated to the dissociation temperature before burning exhibited black swirls on the bulb wall and heavy halogen deposits during similar burning, with failure in some cases occurring before 50,000 cycles.

I claim:

1. In the manufacturing of a tungsten halogen lamp containing a fill including an organic halide, the steps which comprise exhausting the lamp, adding said fill to the lamp, sealing the lamp and then heating the lamp in a nonoxidizing atmosphere to a temperature sufficient to dissociate the organic halide.

2. The process of claim 1 wherein said heating step occurs prior to any lamp burning.

3. The process of claim 1 wherein said organic halide is chloroform.

* * * * *